Figure 2:
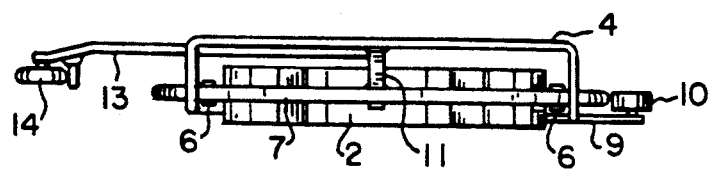

United States Patent [19]

Langen

[11] Patent Number: 5,320,372
[45] Date of Patent: Jun. 14, 1994

[54] ROLLING DEVICE AS GAME OF SKILL

[75] Inventor: Christianus P. Langen, Cuijk, Netherlands

[73] Assignee: Langenberg Research B.V., Cuijk, Netherlands

[21] Appl. No.: 787,913

[22] Filed: Nov. 7, 1991

[30] Foreign Application Priority Data

Nov. 8, 1990 [NL] Netherlands .......................... 9002441

[51] Int. Cl.⁵ ................................................. B62K 1/00
[52] U.S. Cl. ..................................... 280/207; 280/210; 280/221; 482/68
[58] Field of Search ................ 280/207, 206, 205, 210, 280/221, 78, 63, 220; 482/66, 67, 68

[56] References Cited

U.S. PATENT DOCUMENTS

| 228,908 | 6/1880 | Langmaak et al. | 280/207 |
| 357,819 | 2/1887 | Duryea | 280/207 |
| 578,395 | 4/1897 | Estes | 280/207 |
| 607,829 | 7/1898 | Carey | 280/207 |
| 1,625,327 | 4/1927 | Moore | 280/207 |
| 1,673,774 | 6/1928 | Moore | 280/207 |
| 2,019,728 | 11/1935 | Ranck | 280/207 |
| 2,953,394 | 9/1960 | Anderson | 280/207 |
| 3,380,755 | 4/1968 | Pound | 280/207 |
| 4,241,931 | 12/1980 | Healy | 280/205 |

FOREIGN PATENT DOCUMENTS 573801  6/1924  France ........................... 280/207

Primary Examiner—Karin L. Tyson
Assistant Examiner—Kevin Hurley
Attorney, Agent, or Firm—Webb Ziesenheim Bruening Logsdon Orkin & Hanson

[57] ABSTRACT

A rolling device for one person which can be used as game of skill, which rolling device is provided with a frame (2, 3, 4) supporting the person and at least one wheel-like element (7) relative to the frame, wherein the device has only one axis between frame and wheel-like element for allowing a tilting movement of the frame, wherein if necessary means (21) are arranged on the frame which bring about a blocking of the frame relative to the wheel in at least the one rotational sense, such that the user only has to set the frame into a tilting movement to subject the wheel-like element to a rotation and to therefore move himself forward with the frame and the wheel-like element.

10 Claims, 10 Drawing Sheets

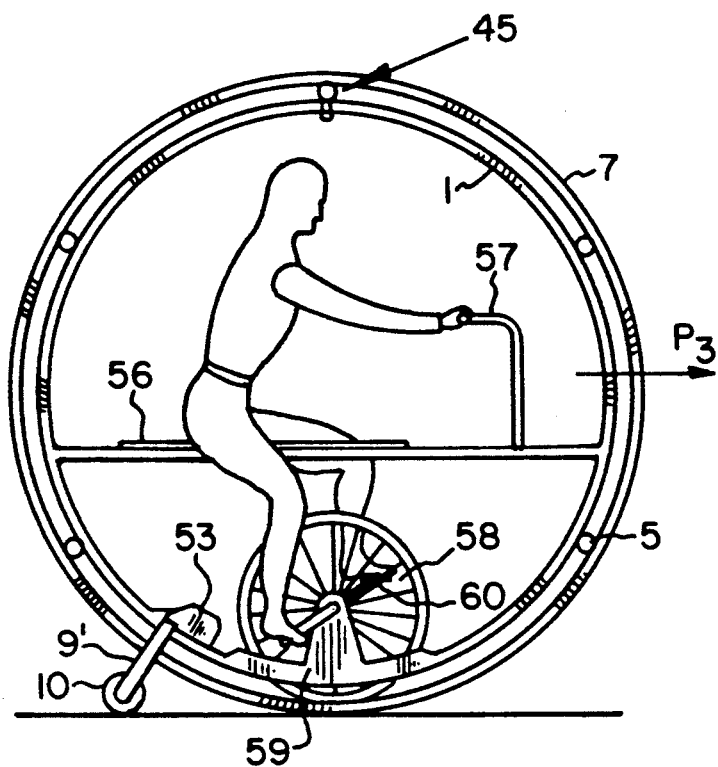
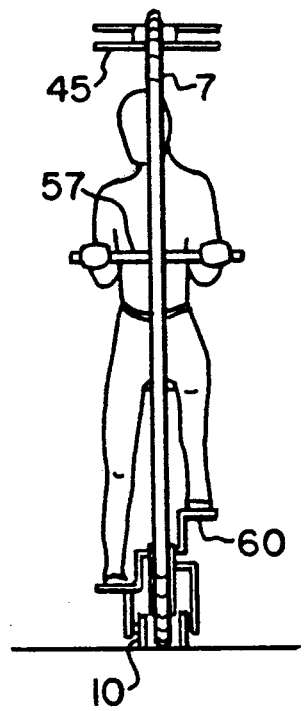
FIG. 23  FIG. 24
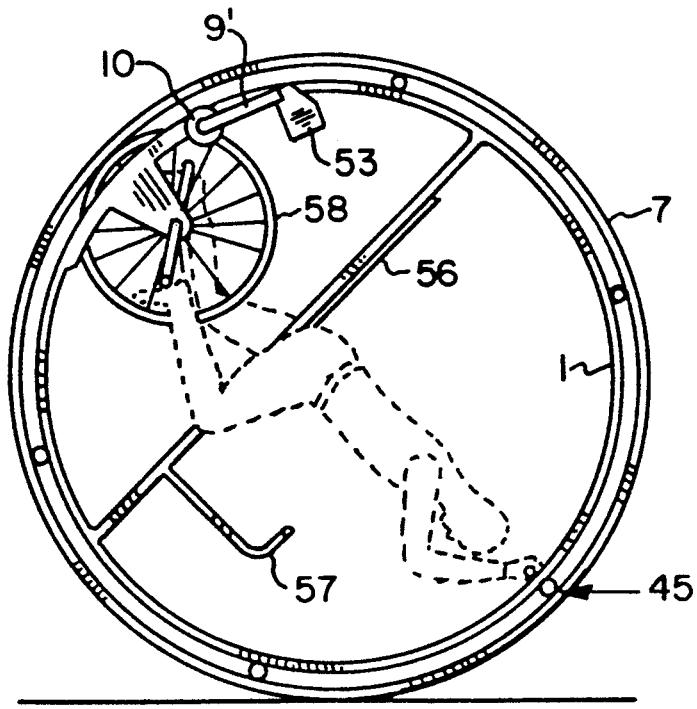
FIG. 25

ROLLING DEVICE AS GAME OF SKILL

The invention relates to a rolling device for one person which can be used as game of skill, which rolling device is provided with a frame supporting the person and at least one wheel-like element relative to the frame.

Diverse embodiments of such a rolling device are already known, wherein worthy of mention is a normal two-wheeler wherein the wheels are each mounted on an individual shaft in a common frame. On such a rolling device the user only has to keep hie balance. Also known are one-wheeled rolling devices wherein the wheel is driven by means of a chain as in a circus version. While the user does require a greater skill here, no progress is possible other than by pedalling via the chain drive.

The invention has for its object to provide a rolling device wherein the user can move forward by changing his position.

The rolling device according to the invention is distinguished in that the device has only one axis between frame and wheel-like element for allowing a tilting movement of the frame, wherein if necessary means are arranged on the frame which bring about a blocking of the frame relative to the wheel in at least the one rotational sense.

The user therefore only has to set the frame into a tilting movement to subject the wheel-like element to a rotation and to therefore move himself forward with the frame and the wheel-like element. If use is made of one wheel the element of skill is increased because the user also has to keep his balance in sideways direction. If use is made of two wheels rotatable about the same axis then the user can still bring about forward movement by setting into tilting movement the tilting frame suspended between the wheels.

The blocking means are preferably formed as freewheel coupling, for instance in the form of a ratchet and a gear rim co-acting therewith which are connected to the frame or wheel-like element or vice versa.

In one embodiment the frame takes an at least partially annular form and the wheel-element is likewise arranged and mounted as a ring at a short distance from the frame ring.

In order to enable improvement of the forward movement it can be advantageous to embody the frame with an arm fixed pivotally thereto which can support on the ground.

This arm can be provided on the free end supporting on the ground with a travel wheel with ratchet mechanism for blocking in the one rotational sense.

The blocking means may also be formed by a drive wheel mounted rotatably in the frame which rolls on the inside of the wheel-like element. The drive wheel can be set into rotation or blocked by the user respectively with hand or foot.

The frame can also be embodied with a brake member that co-acts with the wheel-like element whereby a temporary blocking is effected between frame and wheel-like element.

In addition the frame can be embodied with a stop member which protrudes radially outside the wheel-like element and which can if necessary be provided with a support wheel.

Figure 1:
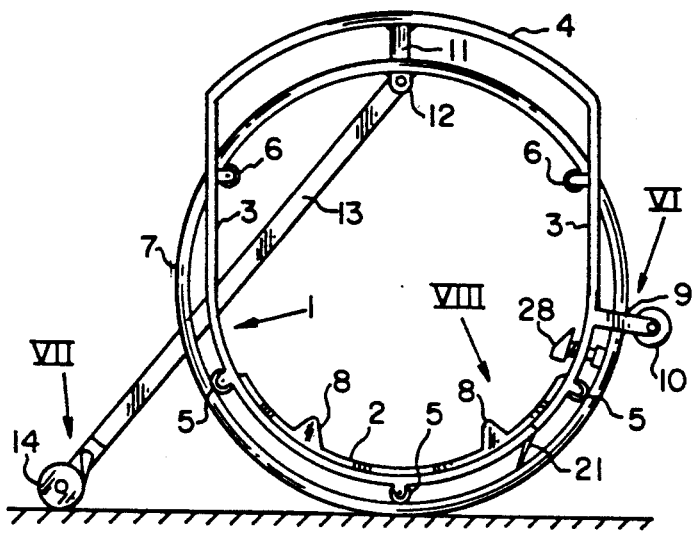
Figure 3:
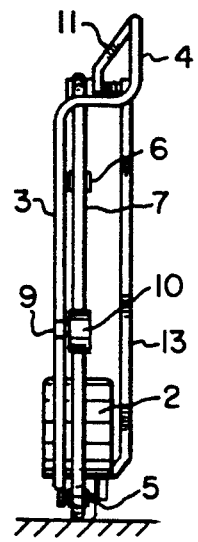
Figure 4:
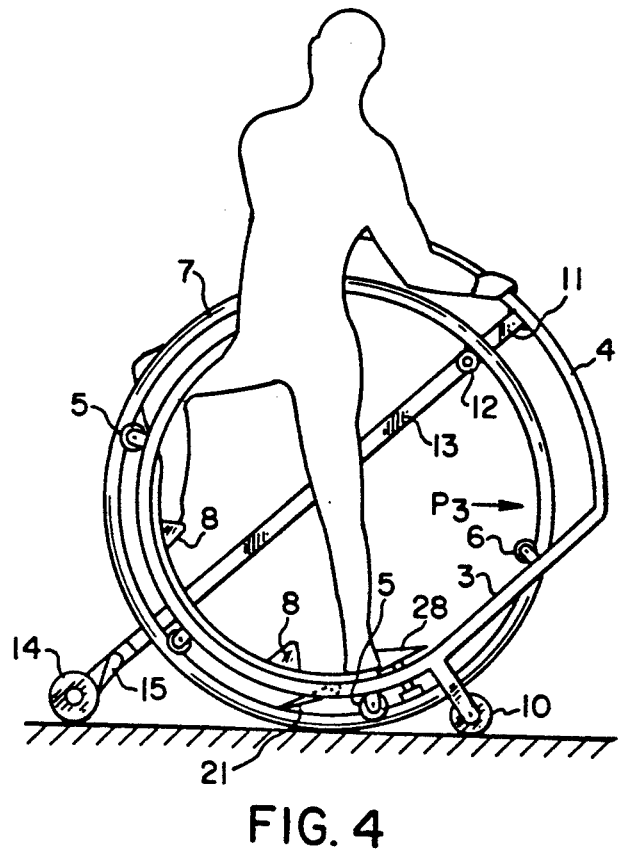
Figure 6:
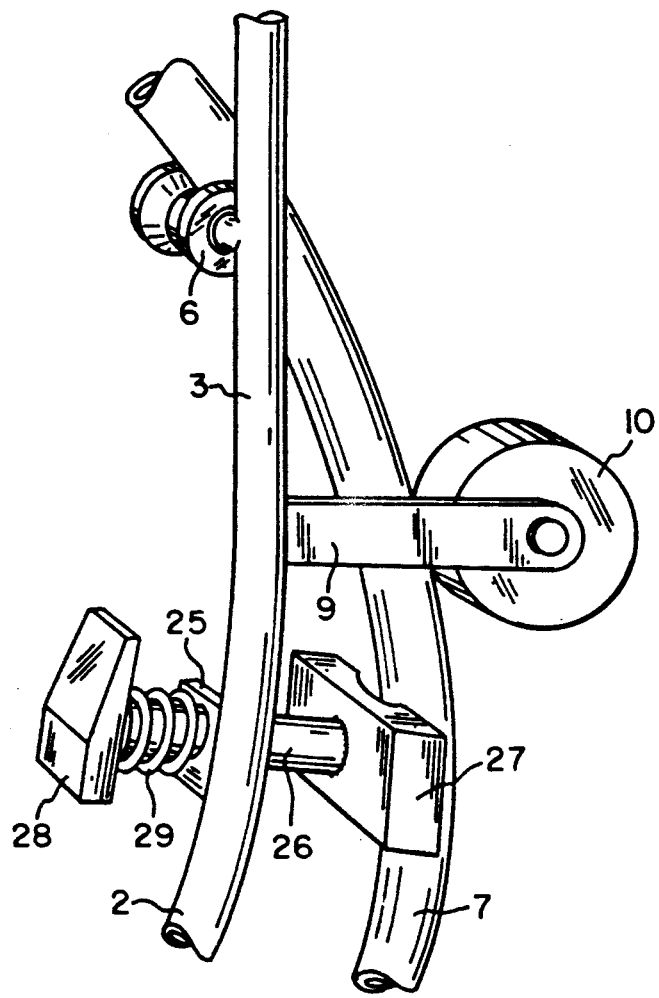
Figure 5:
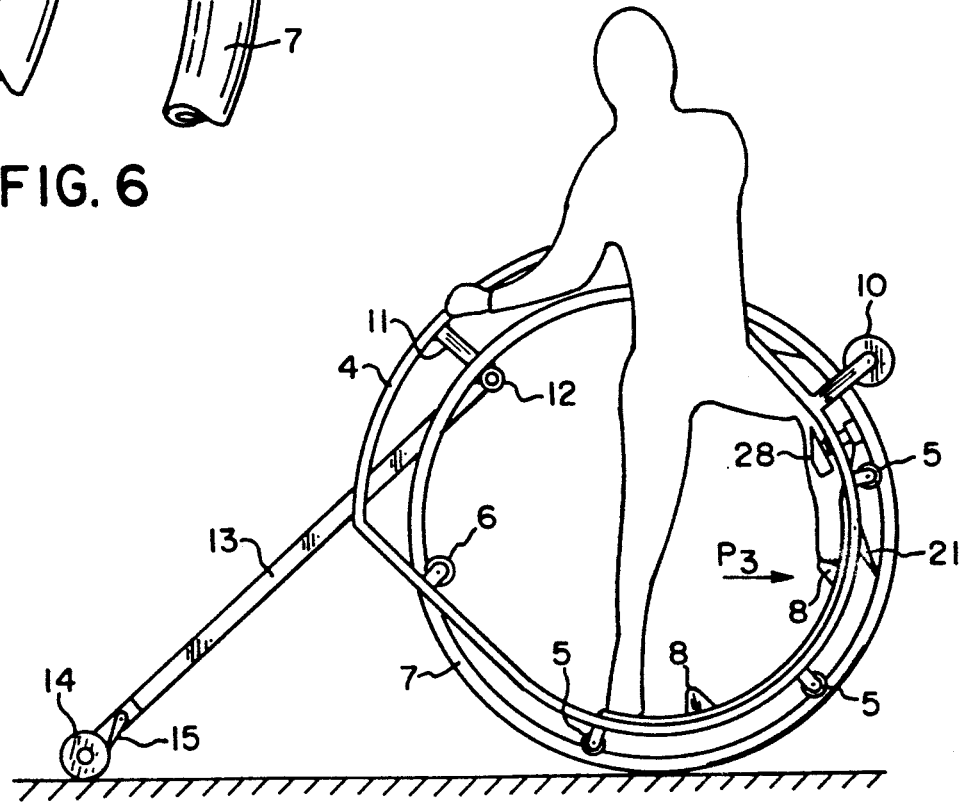
Figure 7:
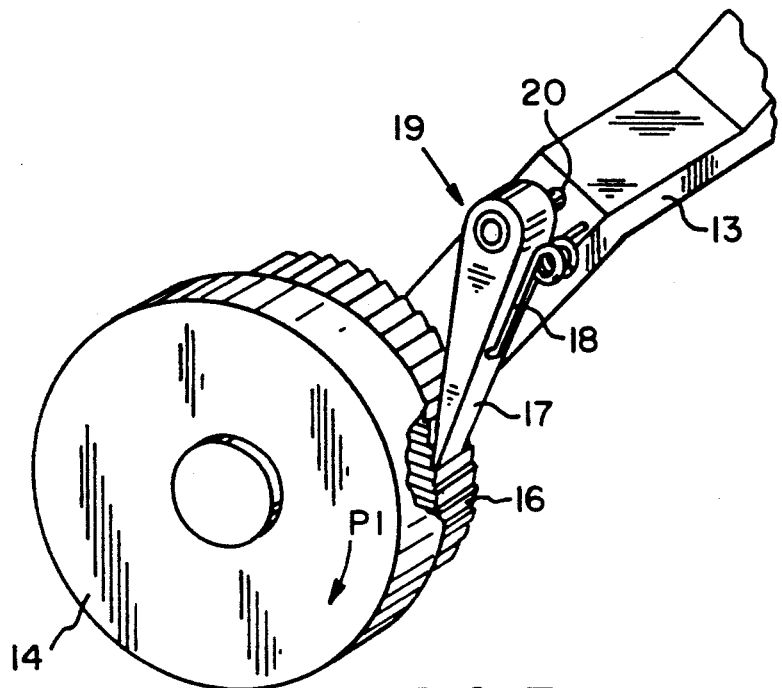
Figure 8:
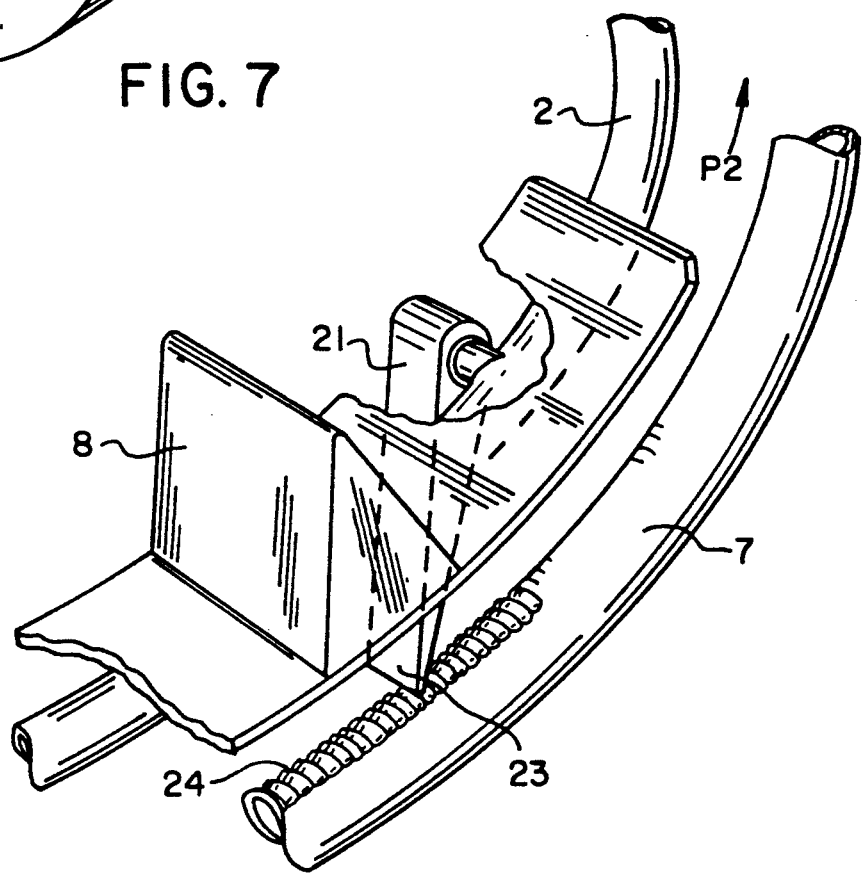
Figure 9:
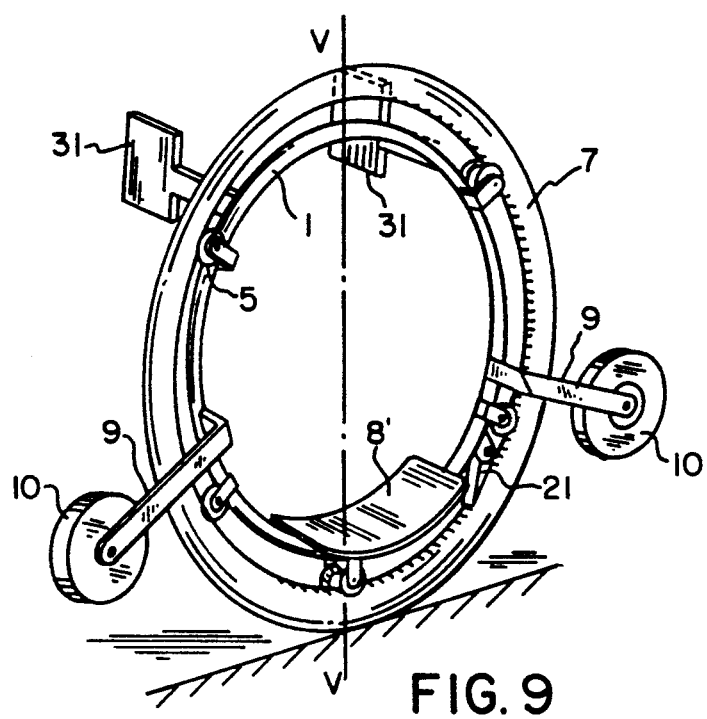
Figure 10:
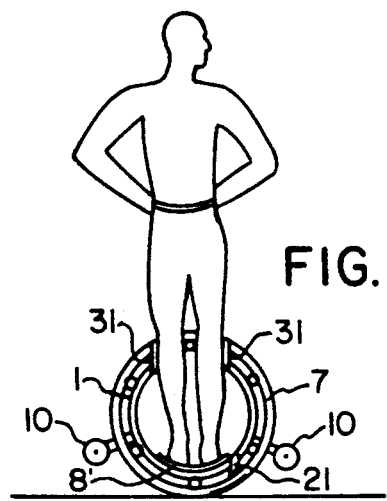
Figure 11:
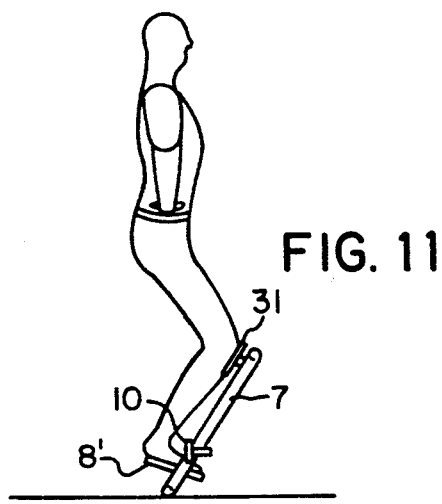
Figure 12:
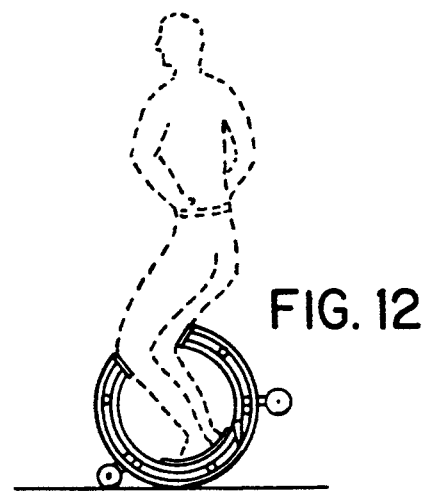
Figure 13:
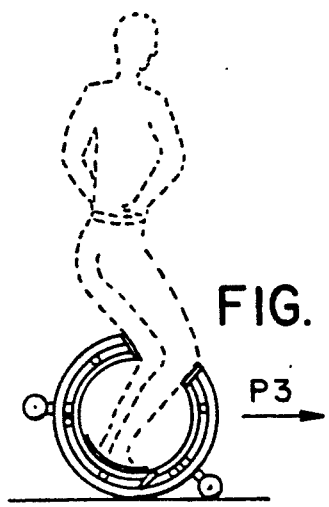
Figure 14:
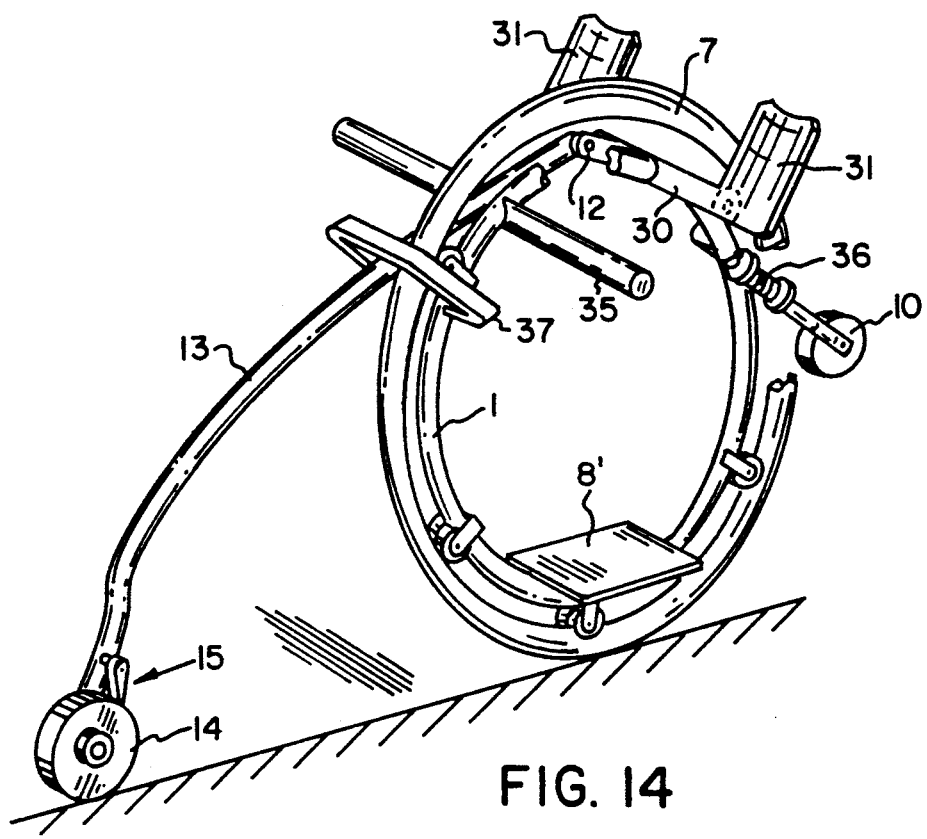
Figures 15, 16, 17:
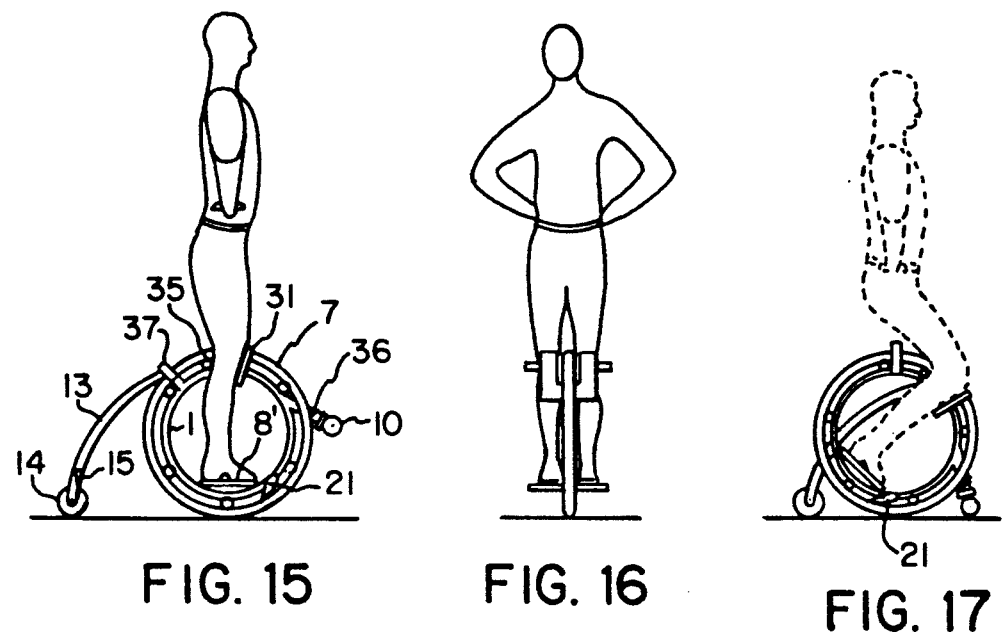
Figure 18:
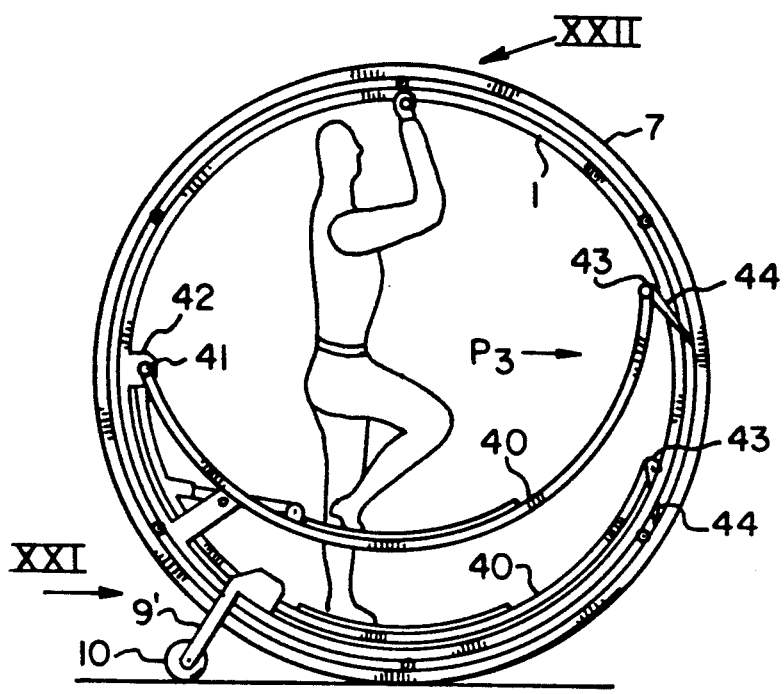
Figure 19:
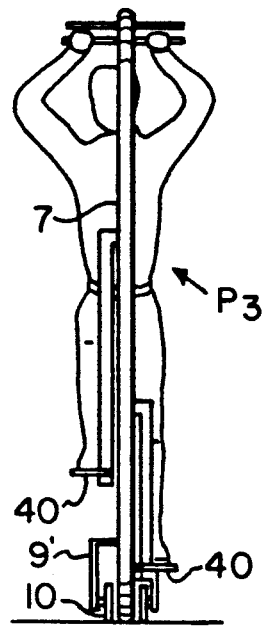
Figure 20:
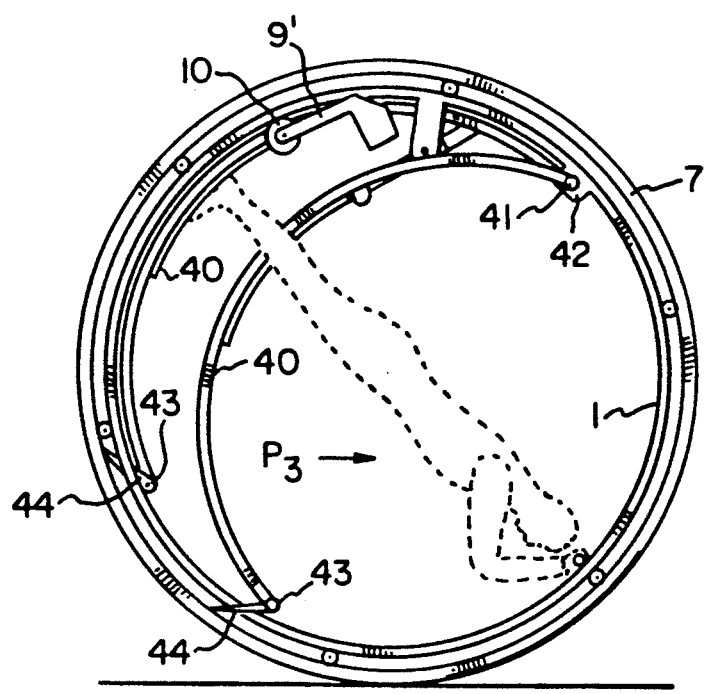
Figure 21:
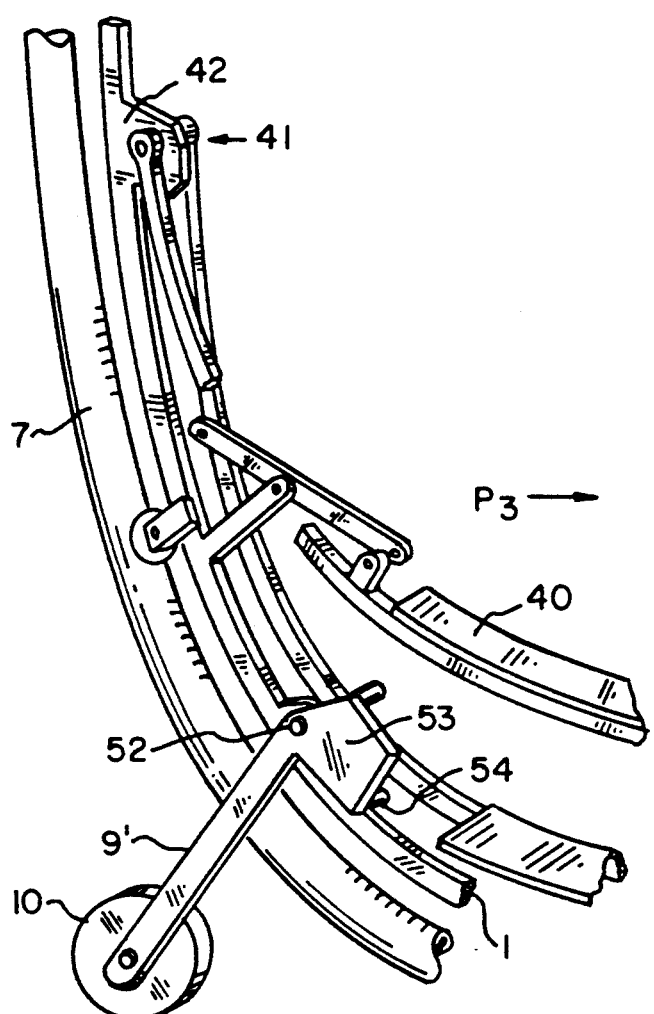
Figure 22:
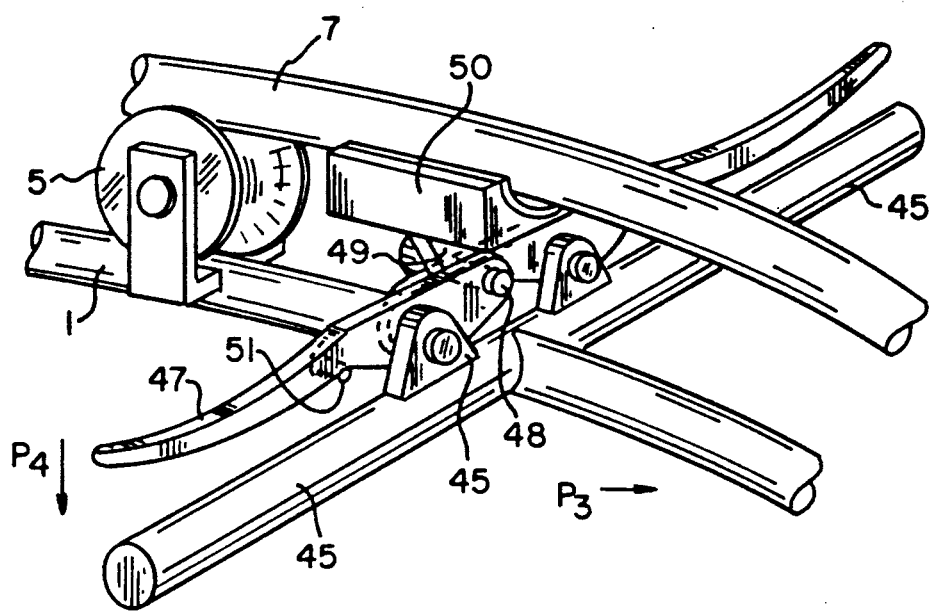
Figure 26:
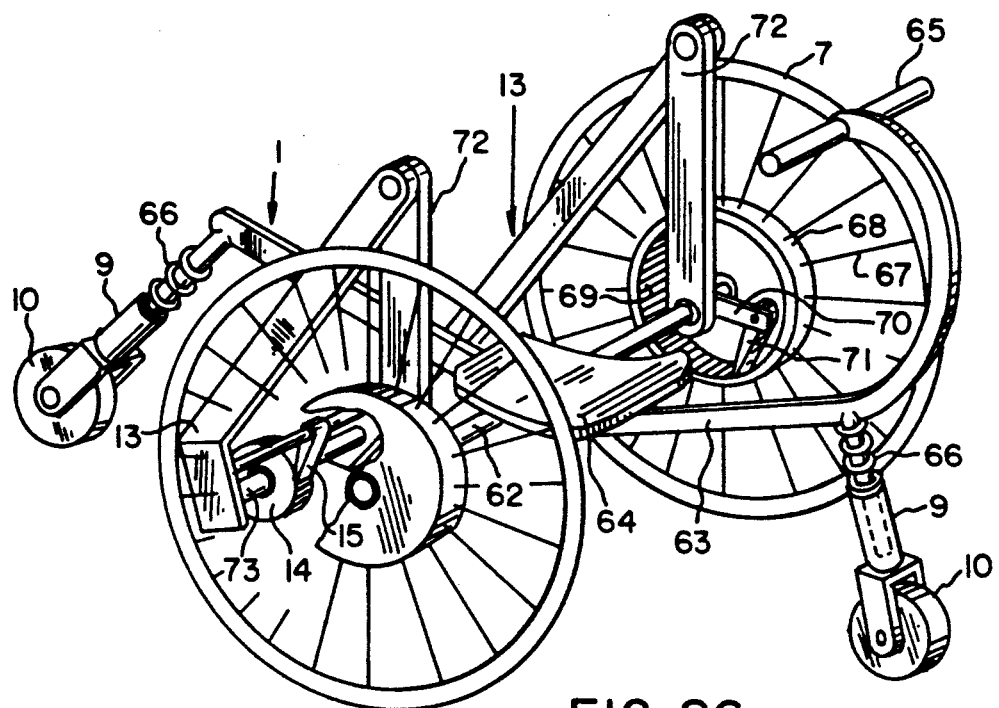
Figure 27:
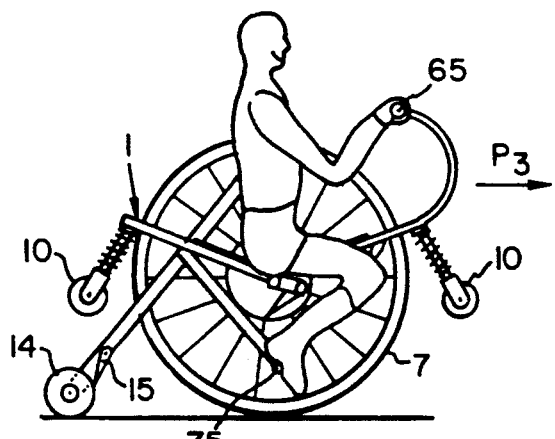
Figure 28:
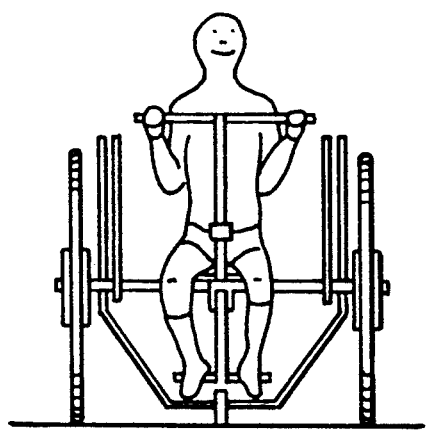
Figure 29:
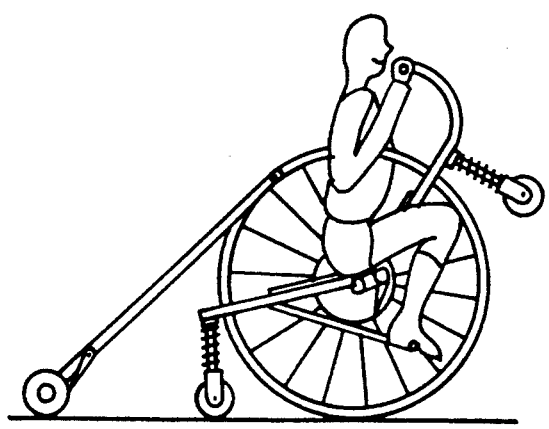
Figure 30:
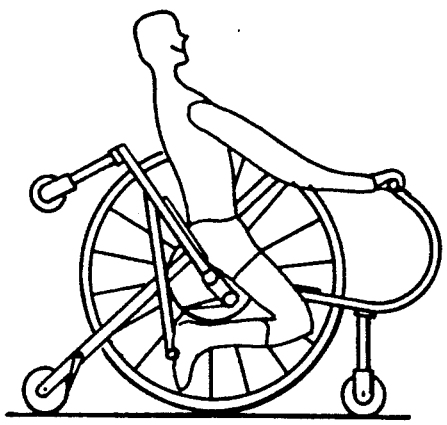
Figure 31:
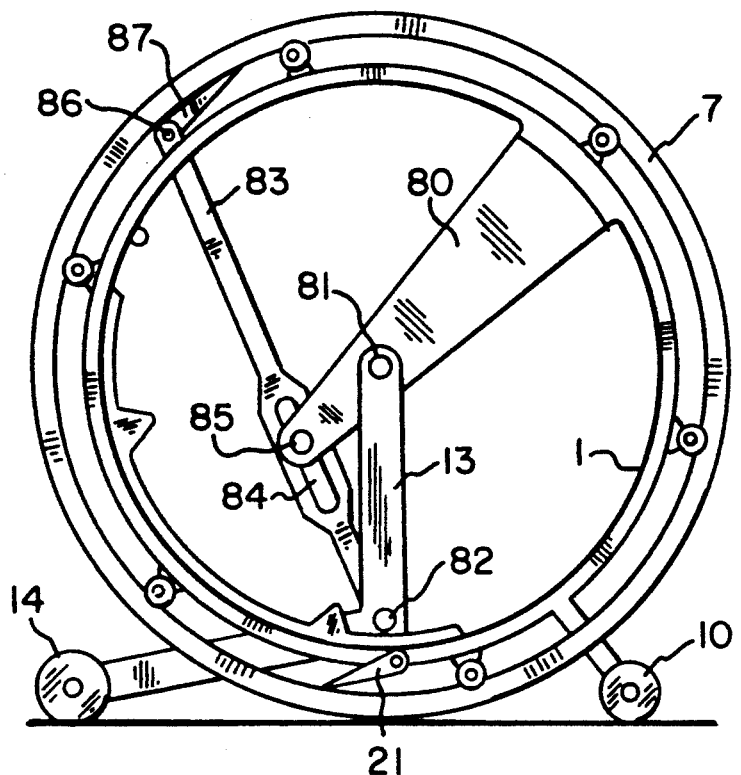
Figure 32:
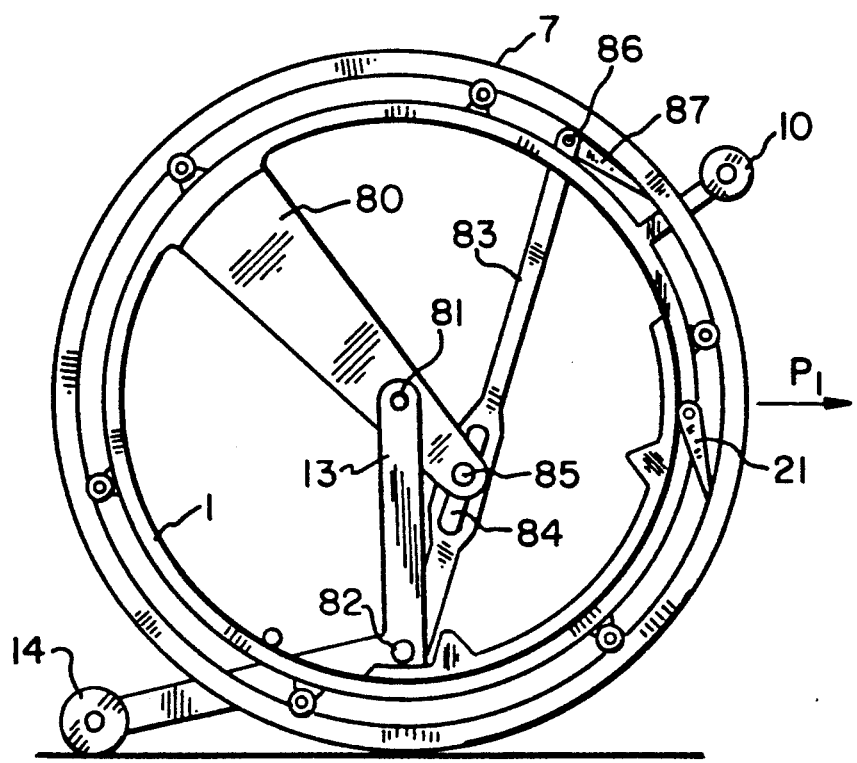

Above mentioned and other features will be further elucidated in the figure description hereinbelow of a number of embodiments. In the annexed drawing:

FIG. 1 shows a standing side view of a first embodiment of the rolling device according to the invention, FIG. 2 and 3 show respectively a top and side view of the embodiment of FIG. 1, FIG. 4 and 5 each show a standing side view corresponding with FIG. 1 of the rolling device in two positions of use, FIG. 6 shows on enlarged scale a perspective view along the arrow VI in FIG. 1 of the stop member and the brake member between frame and wheel-like element, FIG. 7 is a perspective view along the arrow VII in FIG. 1 of the pinion with ratchet mechanism arranged on the free end of a pivot arm, FIG. 8 is a perspective view along the arrow VIII in FIG. 1 of the blocking mechanism according to a first embodiment, FIG. 9 is a perspective standing side view of a second embodiment of the rolling device according to the invention, FIG. 10, 11, 12 and 13 show views of the rolling device of FIG. 9, in each case in a different position of use, FIG. 14 is a perspective view corresponding with that of FIG. 9 of a third embodiment of the rolling device according to the invention, FIG. 15, 16 and 17 each show a view of the different positions of use of the device of FIG. 14, FIG. 18 and 19 show respectively a side and front view of a fourth embodiment of the rolling device according to the invention, FIG. 20 shows a side view corresponding with FIG. 18 in another position of use, FIG. 21 shows on enlarged scale a perspective view of a fold-away blocking member according to the arrow XXI in FIG. 18, FIG. 22 shows on enlarged scale a perspective view of a brake mechanism according to the arrow XXII in FIG. 18, FIG. 23 and 24 show respectively a side and front view of a fifth embodiment of the rolling device according to the invention, FIG. 25 shows a side view corresponding with FIG. 23 in the other position of use of the rolling device, FIG. 26 is a perspective view of a sixth embodiment of the rolling device according to the invention, FIG. 27, 28, 29 and 30 show in each case views of the different positions of use of the rolling device of FIG. 26, FIG. 31 and 32 show side views of a seventh embodiment in two positions.

In the figures the same components are designated with the same reference numerals.

Designated with the reference numeral 1 is the frame of the rolling device which in the embodiment according to FIG. 1–8 has a semi-circular shape 2, wherein the upward oriented part consists of two parallel rods 3 which are connected at the top by a circular bracket 4. It can be seen in FIG. 3 that the bracket 4 is displaced a determined distance relative to the underlying part.

The circular portion 2 of the frame has a number of guide wheels 5, wherein the two parallel rods 3 have guide wheels 6. These guide wheels 5, 6 serve for rotatable supporting of a wheel-like or running wheel element 7. This latter can have any random construction form but is shown here as a curved tube of suitable material and of random transverse profile shape.

The bottom portion 2 of the frame 1 is provided with supports 8 on which the feet of the user can assume position.

Further arranged at the transition between the parallel rods 3 and the bottom portion 2 is a protruding bracket 9, on the free end whereof a support wheel 10 is rotatably mounted (see also the detail in FIG. 6).

The arcuate bracket 4 at the top is provided in the middle with a downward oriented arm 11, on the underside of which an arm 13 is attached rotatably at 12. The free end of the arm 13 is embodied here with a travel wheel 14 provided with a ratchet mechanism 15, see also the detail in FIG. 7. The travel wheel is embodied thereto with a ratchet wheel against which a ratchet 17 is pressed by means of 18, which ratchet is rotatably mounted at 19 about a pin 20 fixed to the arm 13. The gearing of the ratchet wheel such that the wheel 14 can only turn freely in the direction of the arrow P1 and is blocked in the opposing sense.

Arranged according to the invention between the annular bottom frame portion 2 and the running wheel 7 are blocking means which here take the form of a ratchet 21, see FIG. 8 in particular. The ratchet 21 is freely rotatable about pin 22 which is fixed to the frame portion 2, wherein the free end 23 of the ratchet comes into contact with the inner side of the running wheel 7. This inner side can be provided with a roughened surface 24 extending over the whole inner periphery of the running wheel 7. The ratchet position is such that a displacement of the bottom frame portion 2 relative to the running wheel 7 can only occur in the direction of the arrow P2.

Finally, it is noted that a brake mechanism is arranged between frame 2 and running wheel 7, see FIG. 6, which consists here of a lug portion 25 fixedly welded to the frame portion 2 and wherethrough a pin 26 is freely slidable in axial sense. Arranged at the free end of the pin 26 is a brake block 27 which comes into contact with the inner side of the running wheel 7. The pin 26 is provided on the other end with a press-block 28 which can be touched by the user with the knee or otherwise. Arranged between press-block 28 and lug part 25 is a pressure spring 29 which ensures that the brake block stands clear of the running wheel 7 in the non-used position.

The above described rolling device operates as follows. The user takes up position by placing the feet on the lower circular frame portion 2 in the vicinity of the supports 8 and taking hold of the arcuate bracket 4 with the hands. By placing the frame 1 in a tilting position relative to the running wheel 7, see FIG. 4 and 5, the rolling device can be set into a forward movement since, due to the clockwise tilting, the running wheel is locked relative to the frame by means of the blocking mechanism 21, whereby a forward movement is realized. The tilting is bounded by the support wheel 10 on bracket 9. During the return movement from the position of FIG. 4 to that of FIG. 5 the frame 1 is tilted anti-clockwise by weight displacement of the user and displacing the arcuate bracket 4. The frame can rotate freely relative to the running wheel 7 but is displaced in the embodiment according to FIG. 1-8 by means of the arm 13 because the support wheel 14 of the arm 13 is blocked owing to the ratchet mechanism 15. In this way the frame portion 2 is pushed off against the ground and displaced in the direction of arrow P3. The running wheel 7 can therein roll freely over the ground. As a result of a continuous reciprocating tilting movement of frame portion 2 the rolling device can be moved over the ground in the direction of the arrow wherein the user must have skill such that he remains standing upright in the vertical position.

It will be apparent that the brake 28 serves for timely stopping of the rolling device by pressing on the block 28 with the foot, see the position of FIG. 4.

There now follows a description of a second embodiment with reference to FIG. 9–13. This embodiment is characterized by a wholly circular frame 1 provided on the periphery with guide rollers 5 and having on an inner peripheral part a support plank 8' on which the feet of the user can take up position.

In this embodiment two bracket-like supports 9 are arranged with stop rollers 10.

Protruding in axial sense at the top are two supports 30 having broadened plate-like portions 31, this such that they run mutually parallel and roughly mirror-symmetrically relative to the vertical line V—V.

The diameter of the frame and the running wheel 7 supporting on the rollers 5 is considerably smaller than the embodiment of FIG. 1 such that the knees of the user find support against the plates 31 on the supports 30.

Similarly to the embodiment of FIG. 1 a blocking ratchet 21 is arranged between frame and running wheel 7.

By applying a tilting movement of the frame 1 relative to the running wheel 7 by straightening, bending and rotating the knees as according to FIG. 10–13, the rolling device can undergo a forward movement in the direction of the arrow P3, wherein the maximum tilting movement is limited by the stop wheels 10.

The embodiment according to FIG. 14–17 is distinguished from that of FIG. 9–13 by an additional arm 13 which is pivotally attached at 12 to the frame 2. This arm is also embodied with a travel wheel 14 with associated ratchet mechanism 15. The frame is here likewise embodied with a support plank 8' on which the feet of the user can take up position. In contrast to the embodiment of FIG. 9, the knee supports 31 are arranged on the supports 30 on either side of the longitudinal plane of the running wheel 7. Also fixed to the frame at an interval from the knee supports 31 is a knee hollow support 33 in the form of a transverse bar. A closed bracket arranged therebehind serves as stop against the arm 13.

This embodiment is embodied with only one wheel 10 as stop which is here connected to the frame 1 by means of a damping spring 36.

The user can stand on the rolling device by taking the frame with running wheel between the legs and standing on the support 8'. By bending and straightening the knees the desired tilting movement can be performed. In the embodiment shown the ratchet 21 between frame 1 and running wheel 7 can if desired be omitted and support takes place only via the arm 13 and the blocked support wheel 14. As shown in FIG. 17, the forward tilting movement is bounded by the wheel 10.

There now follows a description of the embodiment according to FIG. 18–22.

The frame 1 is here wholly circular, which frame is provided with support rollers 5 for rotatably supporting the running wheel 7. The diameter of the frame 1 is such that the user fits wholly therein in the straightened body position. The embodiment is provided with two arcuate foot supports 40. On the left-hand side in FIG. 18 the foot support 40 is pivotally coupled at 41 to a support 42 of frame 1, see also FIG. 21.

At the opposite end 43 each foot support is embodied with a ratchet body 44 attached pivotally thereto, the free end whereof co-acts with the inner periphery of the running wheel 7.

Arranged as blocking means on either side of frame 1 are hand-grips 45 which are each provided with an eye plate 46 for pivotally supporting a hand-grip 47. The opposite part the hand-grip is pivotally coupled at 48 to a brake plate 49 provided with a brake block 50. The latter can be pressed against the inside of the running wheel 7 by pulling the hang-grips 47 in the direction of arrow 47. A resetting spring 51 provides a tensioning on the brake plate 49 such that the brake block 50 remains clear of the running wheel 7 when the hand-grips 47 are not actuated.

It is finally noted that a swivelling support arm 9' is arranged with stop roller 10. The swivelling support arm 9' is pivotally connected at 52 to the frame, wherein a plate-like body 53 serves as counterweight. The plate 53 is embodied with a stop pin 54 which comes into contact with the frame portion 1 when the position of FIG. 18 and 21 is assumed.

The operation of this device is as follows.

The user stands as in FIG. 18 upright in the annular frame 1 and finds support on the foot supports 40 and handgrips 45. Moving the knees up and down causes the ratchets 44 to slide along the inside of the running wheel 7 whereby a forward movement in the direction of arrow P3 is effected. The user is skilful, he can set the hand brake 50 into operation whereby the movement between the frame 1 and the running wheel 7 is blocked and the generated translation energy is also converted into a rotation energy of the frame 1, whereby the user can assume the position as in FIG. 20 and further. He can even continue rolling wholly through, wherein the stop roller 10 falls each time inside the periphery of the running wheel 7, see FIG. 20, so that it becomes possible to roll through. Rolling back is however prevented by the arm 9' automatically tilting outward as a result of the counterweight plate 53.

There now follows a description of the embodiment according to FIG. 23-25.

This embodiment is distinguished from the previous embodiment as according to FIG. 18-20 in that the frame 1 is embodied with a seat support 56 for the user. The seat support is also provided with a hand-grip 57. On a peripheral part lying on the side of the seat support remote from the hand-grip 57 a drive wheel 58 is rotatably mounted in support 59 attached to the frame. The rotational shaft is provided with pedals 60, this such that the user can set the wheel 58 into forward or backward movement with the feet. The periphery of the wheel 58 runs off on the inside of the running wheel 7 which is itself arranged via the rollers for free rotation round the circular frame 1. This embodiment also has a swivel support 9' with stop wheel 10, which support is also embodied with the counterweight plate 53.

In this embodiment the brake construction according to FIG. 22 can likewise be employed as blocking means, wherein the hand-grips are situated above the head of the user.

The operation of this embodiment is such that by setting the wheel 58 into rotation by means of the pedals 60 the wheel 58 sets the running wheel 7 into rotation, thus bringing about the forward movement in the direction of arrow P3. In this embodiment it is simple to also complete a backward movement opposed to the direction P3, wherein the support wheel 10 prevents tilting over backwards.

By setting the hand-grip with brake 45 into operation on the upper part of the frame 1 a blocking can be effected between the frame and the running wheel 7, whereby the user will turn with the running wheel 7, wherein one of the positions is shown in FIG. 25.

The device according to FIG. 26-30 is distinguished from the previously described device in that here two running wheels 7 are arranged, but in the same line of axis. Frame 1 is connected to the shaft 62 arranged between the wheels 7 and at the coupling to the main beam 63 of frame 1 is ranged a seat support 64.

The main beam 63 is bent upward at the front, wherein the free end is provided with a hand-grip 65 for the user. Arranged on the underside of the main beam 63 at the front is a stop wheel 10 which is fixed to a support 9 which supports via a pressure spring 66 on the main beam 62. Likewise mounted on the free rear end of the main beam 63 is a support wheel 10 with a resilient construction similar to that at the front.

Each wheel 7 is connected via spokes 67 to a hub 68, on the inside whereof is arranged a gear rim 69. The shaft 62 is provided with an arm 70, the free end whereof is provided with a ratchet 71. This ratchet 71 co-acts with the gear rim 69, this such that the rotational sense of the hub 68 and the wheel 7 relative to frame 1 is blocked in the one direction by the ratchet mechanism 69, 71. This latter can be substituted within the scope of the invention by any other freewheel system.

The frame is additionally embodied with an upward oriented arm 72 which is fixedly attached at the bottom to the shaft 62. Each arm 72 on either side of the seat 64 is pivotally coupled at the top to an arm 13, to the free lower end of which is attached a shaft 73 which leads to the parallel arm on the other side of the device. Shaft 73 is provided with a support wheel 14 with ratchet mechanism 15.

The operation of this device is as follows:

Because the user sits on the seat 64 he can give the frame 1 a tilting movement by displacing his weight from front to rear relative to the shaft 62. Herein the feet find support on a foot support 75, wherein it is noted that the position of the stop wheels 10 relative to the rotating shaft 62 and running wheels 7 is such that the user can make this tilting movement of the frame 1 through a certain angle sufficient to be able to set the ratchet mechanism 69, 71 into operation so that a forward movement in the direction of arrow P3 takes place. When the frame 1 is tilted back the ratchet mechanism 68, 71 is free-running but a pushing force is exerted on the frame 1 as a result of the blocking wheels 14 on the bottom end of the arms 13.

Finally, the embodiment according to FIG. 31 and 32 which is substantially similar to the embodiments provided with one wheel, has a circular frame 1 and a wheel 7 mounted therearound with rollers 5. Frame 1 is embodied here with an inwardly pointing support 80 which is provided precisely in the rotational centre with a pin 81 for rotatable attaching thereto of a support arm 13. This latter is provided at its extremity with a support wheel 14.

Turning the frame relative to the horizontal will therefore have no effect on the position of arm 13 which remains in the same position in this embodiment.

The arm 13 has an L-shaped form and is likewise provided in the angle with a pivot pin 82 around which a shore 83 is pivotally mounted. The shore is embodied with a slotted hole 84 in which a pin 85 lying perpendicular to the support 80 is slidably inserted. The free end 86 of shore 83 is embodied with a ratchet 87.

For the sake of completeness it is stated that a blocking member in the form of a ratchet 21 is likewise arranged between the frame 1 and wheel 7.

Turning of the frame 1 in clockwise direction will bring about a blocking relative to the wheel 7, whereby a driving from the position in FIG. 32 to the position of FIG. 31 takes place directly from the frame onto the wheel 7, thus affecting a forward movement in the direction of the arrow P1.

When the frame 1 moves back from the position in FIG. 31 to that of FIG. 32, that is, in anti-clockwise direction, this causes a rotation of the support 80 about the centre point 81 and therefore a displacement of the pin 85 on that same centre 81. The pin 85 carries the shore 83 with it by sliding in the slotted hole 84 and exerting a pushing force, wherein the shots 83 turns on the pin 82. This turning causes a connection as a result of the ratchet 87 between frame 1 and wheel 7 so that, also when the frame 1 moves back, a forward movement in the direction of the arrow P1 is realized.

The invention is not limited to the above described embodiments.

I claim:

1. A rolling device for one person which can be used as game of skill, comprising a unitary frame supporting the person and at least one running wheel attached to said unitary frame, wherein said unitary frame rotates about an axis and said unitary frame is tiltable about said axis relative to said running wheel wherein said unitary frame is directly positioned by said person; and means for blocking of said unitary frame relative to said wheel in at least one rotational sense wherein said unitary frame drives said running wheel in a first direction through a continuous, clockwise and counterclockwise, oscillating movement of said unitary frame relative to said axis, wherein the blocking means are embodied in the form of a freewheel coupling having a ratchet with a co-acting gear rim, one of the ratchet and gear rims connected to the frame and the other of the ratchet and gear rims connected to the wheel-like element.

2. A rolling device for one person which can be used as game of skill, comprising a unitary frame supporting the person and at least one running wheel attached to said unitary frame, wherein said unitary frame rotates about an axis and said unitary frame is tiltable about said axis relative to said running wheel wherein said unitary frame is directly positioned by said person; and means for blocking of said unitary frame relative to said wheel in at least one rotational sense wherein said unitary frame drives said running wheel in a first direction through a continuous, clockwise and counterclockwise, oscillating movement of said unitary frame relative to said axis, and the drive means are arranged between said unitary frame and said running wheel, further comprising a ratchet member displaceable relative to the frame, said ratched member is arranged as the drive means and coacts with the inside of the running wheel.

3. A rolling device as claimed in claim 2, wherein the ratchet member is pivotally attached to a foot support that is pivotable relative to the frame.

4. A rolling device for one person which can be used as game of skill, comprising a unitary frame supporting the person and at least one running wheel attached to said unitary frame, wherein said unitary frame rotates about an axis and said unitary frame is tiltable about said axis relative to said running wheel wherein said unitary frame is directly positioned by said person; and means for blocking of said unitary frame relative to said wheel in at least one rotational sense wherein said unitary frame drives said running wheel in a first direction through a continuous, clockwise and counterclockwise, oscillating movement of said unitary frame relative to said axis, wherein the frame bears a pivotable arm having a free end that can support the frame on the ground.

5. A rolling device for one person which can be used as game of skill, comprising a unitary frame supporting the person and at least one running wheel attached to said unitary frame, wherein said unitary frame rotates about an axis and said unitary frame is tiltable about said axis relative to said running wheel wherein said unitary frame is directly positioned by said person; and means for blocking of said unitary frame relative to said wheel in at least one rotational sense wherein said unitary frame drives said running wheel in a first direction through a continuous, clockwise and counterclockwise, oscillating movement of said unitary frame relative to said axis, wherein the diameter of the frame corresponds roughly with the half-leg height of the person and the frame includes one or more knee supports.

6. A rolling device as claimed in claim 5, further comprising a support roller arranged on the stop resiliently relative to the frame.

7. A rolling device for one person which can be used as game of skill, comprising a unitary frame supporting the person and at least one running wheel attached to said unitary frame, wherein said unitary frame rotates about an axis and said unitary frame is tiltable about said axis relative to said running wheel wherein said unitary frame is directly positioned by said person; and means for blocking of said unitary frame relative to said wheel in at least one rotational sense wherein said unitary frame drives said running wheel in a first direction through a continuous, clockwise and counterclockwise, oscillating movement of said unitary frame relative to said axis and wherein said frame has one stop protruding radially outside said running wheel and wherein said radially protruding stop comprises a travel wheel.

8. A rolling device for one person which can be used as game of skill, comprising a frame supporting the person and at least one running wheel attached to the frame, wherein the frame rotates about an axis and the frame is tiltable about the axis; and means for blocking of the frame relative to the wheel in at least one rotational sense wherein the diameter of the frame corresponds roughly with the half-leg height of the person and the frame includes one or more knee supports.

9. A rolling device as claimed in claim 8, further comprising a support roller arranged on the stop resiliently relative to the frame.

10. A rolling device for one person which can be used as game of skill, comprising a frame supporting the person and at least one running wheel attached to said frame, wherein said frame rotates about an axis and said frame is tiltable about an axis relative to said running wheel; and means for blocking of said frame relative to said wheel in at least one rotational sense wherein said frame drives the running wheel in a first direction through a continuous, clockwise and counterclockwise, oscillating movement of said frame relative to said axis; and wherein the diameter of the frame corresponds roughly with the half-leg height of the person and the frame includes one or more knee supports.

* * * * *

UNITED STATES PATENT AND TRADEMARK OFFICE
CERTIFICATE OF CORRECTION

PATENT NO. : 5,320,372
DATED : June 14, 1994
INVENTOR(S) : Christianus P. Langen It is certified that error appears in the above-indentified patent and that said Letters Patent is hereby corrected as shown below:

Title page, item [56], under References Cited, U.S. PATENT DOCUMENTS, add --3,622,179 11/1971 Pfersick ... 280/207--
and, under FOREIGN PATENT DOCUMENTS, add --754074 1/1971 Belgium . and 0005254 11/1979 European .--.

Column 1 Line 12 "hie" should read --his--.

Column 3 Line 14 after "wheel" insert --16--.

Column 3 Line 15 after "of" insert --a spring--.

Column 3 Line 17 after "wheel" (first occurrence) insert --16 is--.

Column 4 Line 2 after "arrow" insert --P3,--.

Column 4 Line 48 "am" should read --arm--.

Column 5 Line 28 "handgrips" should read --hand-grips--.

Column 5 Line 31 "The" should read --If the--.

Column 5 Line 56 after "rollers" insert --5--.

Column 6 Line 14 "ranged" should read --is arranged--.

UNITED STATES PATENT AND TRADEMARK OFFICE
CERTIFICATE OF CORRECTION

PATENT NO. : 5,320,372

DATED : June 14, 1994

INVENTOR(S) : Christianus P. Langen

It is certified that error appears in the above-indentified patent and that said Letters Patent is hereby corrected as shown below:

Column 7 Line 12 "affecting" should read --effecting--.

Column 7 Line 19 "shots" should read --shore--.

Claim 2 Line 59 Column 7 "ratched" should read --ratchet--.

Claim 2 Line 60 Column 7 "coacts" should read --co-acts--.

Signed and Sealed this

Twenty-seventh Day of September, 1994

Attest:

Attesting Officer

BRUCE LEHMAN

Commissioner of Patents and Trademarks